(12) United States Patent
Perreault et al.

(10) Patent No.: US 9,004,473 B2
(45) Date of Patent: Apr. 14, 2015

(54) ARTICULATED WORK HOLDER FOR A REMOTE CONTROLLED VEHICLE AND THE LIKE

(76) Inventors: Brad Lee Perreault, Charlottesville, VA (US); David Morris, Charlottesville, VA (US)

( * ) Notice: Subject to any disclaimer, the term of this patent is extended or adjusted under 35 U.S.C. 154(b) by 837 days.

(21) Appl. No.: 13/206,897

(22) Filed: Aug. 10, 2011

(65) Prior Publication Data

US 2012/0038095 A1   Feb. 16, 2012

Related U.S. Application Data

(60) Provisional application No. 61/372,702, filed on Aug. 11, 2010.

(51) Int. Cl.
| | |
|---|---|
| *B25B 5/00* | (2006.01) |
| *B25B 5/06* | (2006.01) |
| *B23Q 3/00* | (2006.01) |
| *A63H 17/26* | (2006.01) |
| *F16M 11/20* | (2006.01) |
| *F16M 11/24* | (2006.01) |
| *F16M 13/02* | (2006.01) |
| *A63H 30/04* | (2006.01) |

(52) U.S. Cl.
CPC ............... *A63H 17/26* (2013.01); *A63H 30/04* (2013.01); *F16M 11/2007* (2013.01); *F16M 11/2085* (2013.01); *F16M 11/2092* (2013.01); *F16M 11/24* (2013.01); *F16M 13/022* (2013.01)

(58) Field of Classification Search
USPC ............ 269/17, 71, 75, 55, 37.38, 39, 40, 41, 269/42, 43, 296; 254/133 R, 134
See application file for complete search history.

(56) References Cited

U.S. PATENT DOCUMENTS

| | | | | |
|---|---|---|---|---|
| 2,019,789 | A | * | 11/1935 | Mahannah ........................ 269/71 |
| 2,513,027 | A | * | 6/1950 | Kruczek ..................... 248/181.1 |
| 3,973,766 | A | | 8/1976 | Heath |
| 4,026,535 | A | | 5/1977 | Heath |
| 4,253,649 | A | | 3/1981 | Hewson |
| 4,402,481 | A | | 9/1983 | Sasaki |
| 4,500,077 | A | | 2/1985 | Coxon |
| 4,564,179 | A | | 1/1986 | Hollingsworth |
| 4,647,001 | A | * | 3/1987 | Sarette et al. ................. 249/205 |
| 4,900,000 | A | | 2/1990 | Solberg |
| 4,949,944 | A | | 8/1990 | Groff, Sr. |
| 4,971,301 | A | * | 11/1990 | Yang .............................. 269/153 |
| 5,011,364 | A | * | 4/1991 | Anderson ..................... 414/694 |
| 5,193,791 | A | * | 3/1993 | Schwarz ....................... 269/268 |
| 5,193,792 | A | * | 3/1993 | Di Marco ...................... 269/282 |
| 5,335,900 | A | | 8/1994 | Bonde |
| 5,765,821 | A | * | 6/1998 | Janisse et al. ................... 269/16 |
| 5,775,679 | A | * | 7/1998 | Strub .............................. 269/75 |
| 6,595,508 | B2 | * | 7/2003 | Duncan ......................... 269/242 |
| 6,874,737 | B1 | | 4/2005 | Madelone |
| 6,981,306 | B1 | * | 1/2006 | Clouser .......................... 29/559 |
| 7,354,023 | B1 | * | 4/2008 | Wappler .................... 248/206.5 |
| 8,328,173 | B1 | * | 12/2012 | DesForge et al. ............... 269/71 |

(Continued)

*Primary Examiner* — Lee D Wilson
*Assistant Examiner* — Marc Carlson
(74) *Attorney, Agent, or Firm* — Kile Park Reed & Houtteman PLC

(57) ABSTRACT

An articulated work holder for a fractional dimensioned, performance vehicle including a base member and first, second and third, support arms having multiple degrees of rotational movement and a vise member carrying vehicle engagement pads for supporting a fractional dimensioned, performance vehicle between the vise engagement pads.

8 Claims, 14 Drawing Sheets

(56) References Cited

U.S. PATENT DOCUMENTS

2002/0171191 A1* 11/2002 Hudson ......................... 269/279
2008/0106020 A1* 5/2008 Sherlock ........................ 269/71
2009/0302517 A1* 12/2009 Patel ............................... 269/71
2010/0198052 A1* 8/2010 Jenkins et al. ................ 600/417
2011/0022034 A1* 1/2011 Wilson et al. ..................... 606/1

* cited by examiner

ARTICULATED WORK HOLDER FOR A REMOTE CONTROLLED VEHICLE AND THE LIKE

CROSS-REFERENCE TO RELATED APPLICATION

This application claims the priority of applicants' U.S. Provisional Application Ser. No. 61/372,702, filed on Aug. 11, 2010. The contents of applicants' Provisional Application is hereby incorporated by reference as thought set forth at length.

BACKGROUND OF THE INVENTION

This invention relates to a work holder for fractional dimension, high performance, vehicles such as remotely controlled nitro cars, trucks, airplanes, boats, helicopters and the like. More specifically this invention relates to an articulated holder with multiple degrees of freedom at a plurality of junction locations that is operable to position a high end, performance vehicle in a comfortable working position and posture so that delicate and detailed construction, modification, service and repair work can be facilely performed.

In the high performance, factional dimension, vehicle market accurate but proportionally downsized vehicles provide hours of pleasure for engineers and enthusiasts. In this connection remotely controlled cars, trucks, airplanes, etc. can be fabricated with hundreds and even thousands of highly sophisticated precision dimensioned parts. In this, a high end, fractional dimension, performance vehicle may have several hundred operating parts that require assembly, repair, maintenance and service. A high performance vehicle, sometimes with embedded electronics, may require sophisticated fabrication and can be made to be capable of performance in a manner similar to a full scale counterpart. As an example a nitro car or truck may reach speeds of fifty miles and hour or so under the right conditions. These vehicles are suitable for display, racing and high end performance.

One problem with such high end performance vehicles is that they are fabricated with minute precision parts and fittings. This makes them difficult and time consuming to fabricate and then equally difficult, if not more difficult, to maintain and keep running at a high level of design performance.

In the past maintenance work was performed on a work bench. In the field maintenance work may be performed on the ground or in a van designed to transport such vehicles. Working in a bent over or kneeling posture in poor sight conditions with delicate structures and numerous small parts can be excessively tiring and often frustrating.

Typical tasks that need to be address with a high end sophisticated vehicle are changing parts (such as wheels), maintaining shock absorbers and suspensions, repairing and changing transmissions, repairing clutch bells, rods, gears, etc. and performing upgrades of all kinds. Maintenance and/or repair is necessary almost every time a high performance, precision, vehicle is operated.

Maintenance and/or repairs often take longer to perform than the time a vehicle is actually operated as intended. Moreover the fractional scale and precision of these vehicles means that there are a number of small parts that tend to get misplaced and are delicate to handle. Unfortunately, in the field, suitable work spaces are limited and the time between competition events makes efficiency essential. Still further the weight of some vehicles—although nothing like a full-scale version—is not entirely insignificant.

The present invention is designed to obviate or minimize problems of the type described as well as addressing other issues dealing with operating proportionally downsized, sophisticated, vehicles.

It is envisioned that the subject invention can be used on numerous types of high end remotely controlled vehicles such as cars, trucks, airplanes, boats, helicopters and the like. Specialized clamps enable secure retention of delicate or oddly-shaped parts. Moreover, the subject invention is operable to position vehicles out of the way for indefinite periods.

In order to accommodate various models specialized clamping jaws or pads are used for delicate or oddly shaped parts. A magnetic holder enables small parts to be secured in a readily accessible position. Vision is also of concern with scaled down models and an adjustable LED light enables illumination when and where needed. This eliminates any need for a second pair of hands to hold a flashlight, etc. A highly adjustable mounting arrangement enables attachment to a variety of secure stands or fixtures. Multiple degrees of articulation enables a fractional dimension vehicle to be positioned for extended periods in different positions to enable the best and most comfortable working conditions.

Still further work clamp arrangements are specifically designed not to block hands or tools necessary to perform assembly or maintenance functions. This makes repairs and maintenance easier and faster. When a performance vehicle is positioned in the air it is advantageously away from contaminants such as dirt, grease, etc. that exists on many work benches, table tops or field environments.

The problems and limitations suggested in the preceding are not intended to be exhaustive but rather are among many which may tend to reduce the effectiveness of previously known fabrication and maintenance functions on sophisticated, fractional dimension, vehicles. Other noteworthy problems may also exist; however, those presented above, along with envisioned advantages attributable to the present invention should be sufficient to demonstrate that a work holder for sophisticated, fractional dimension vehicles such as remotely controlled nitro cars, trucks, airplanes, boats, helicopters and the like will admit to worthwhile improvement.

THE DRAWINGS

Other aspects of the present invention will become apparent from the following detailed description of preferred embodiments taken in conjunction with the accompanying drawings wherein.

Figure 5:
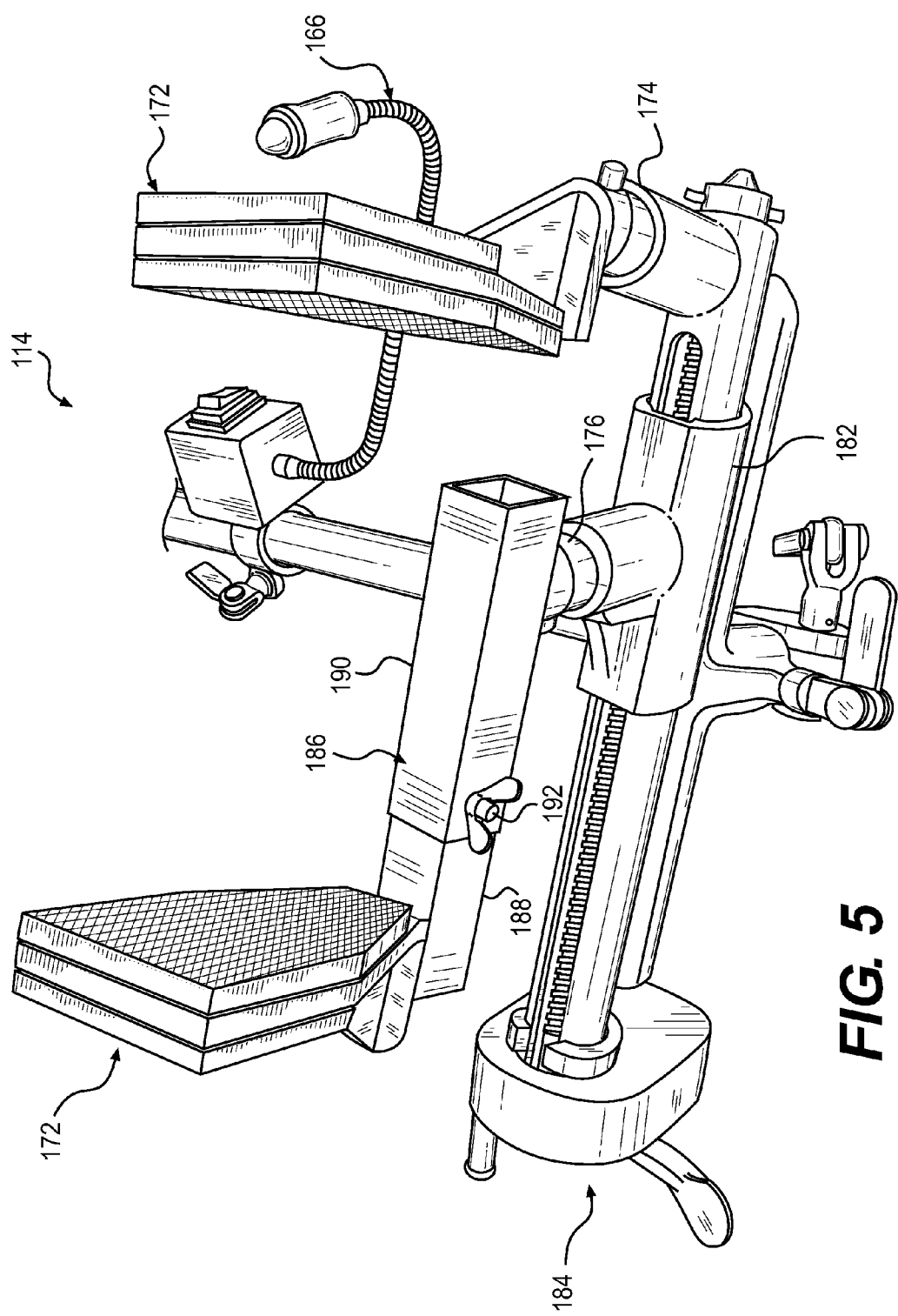
Figure 6:
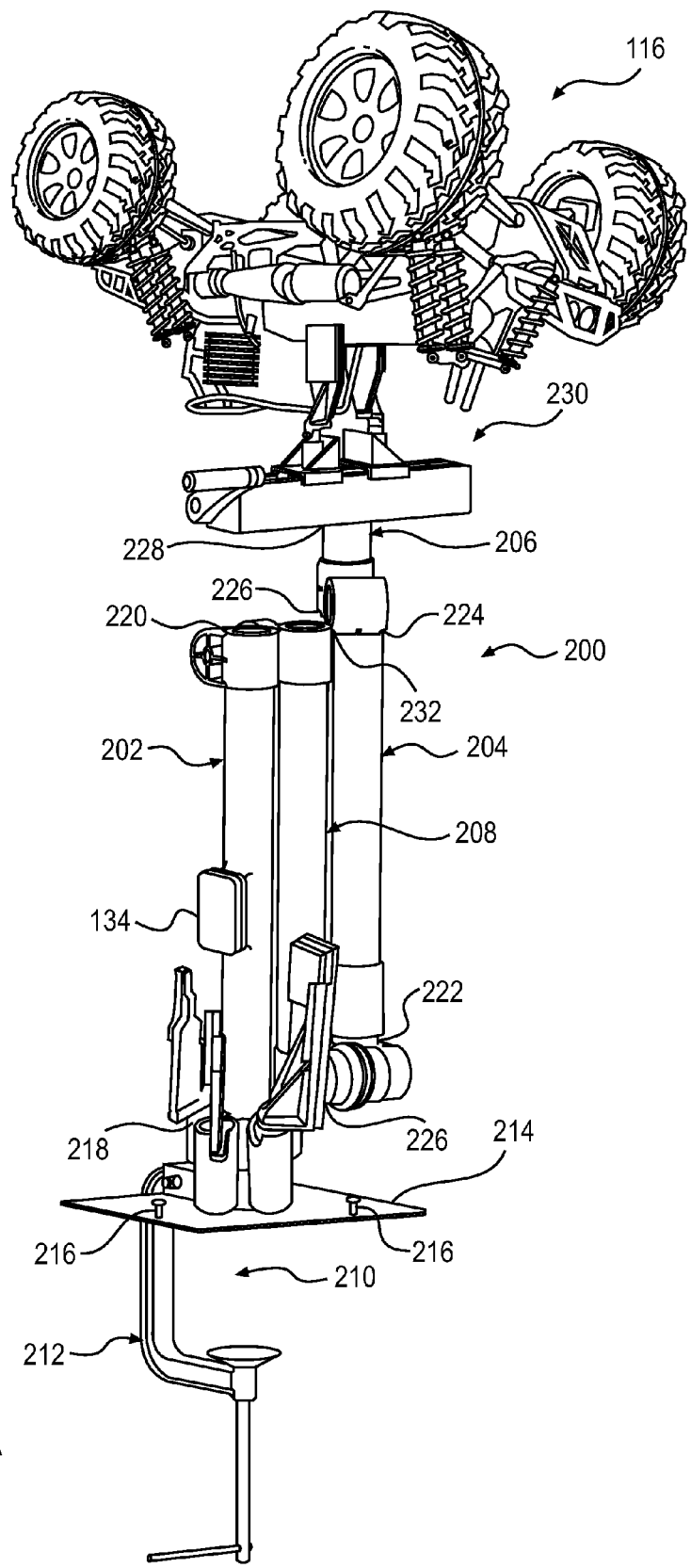
Figure 7:
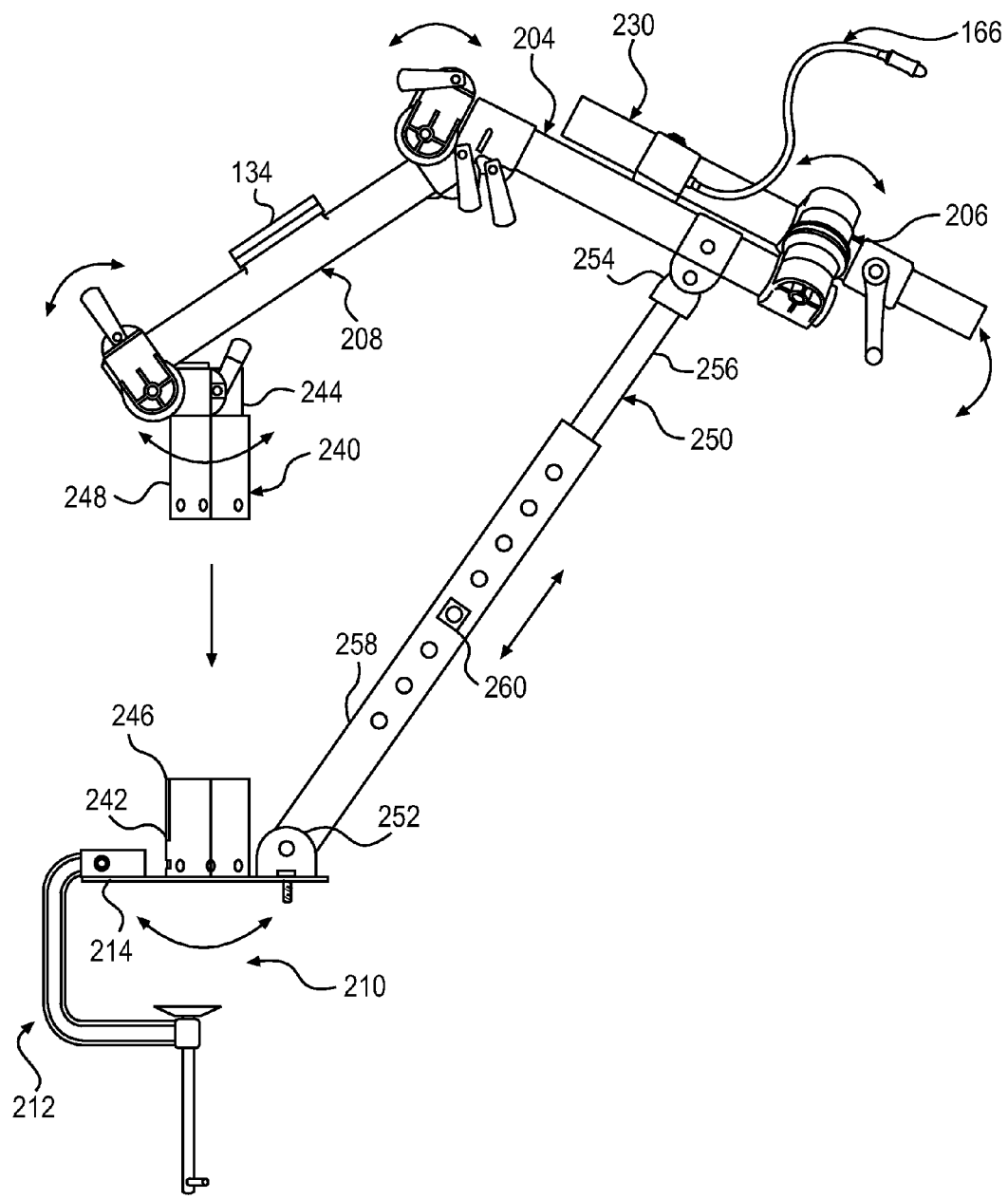
Figure 8:
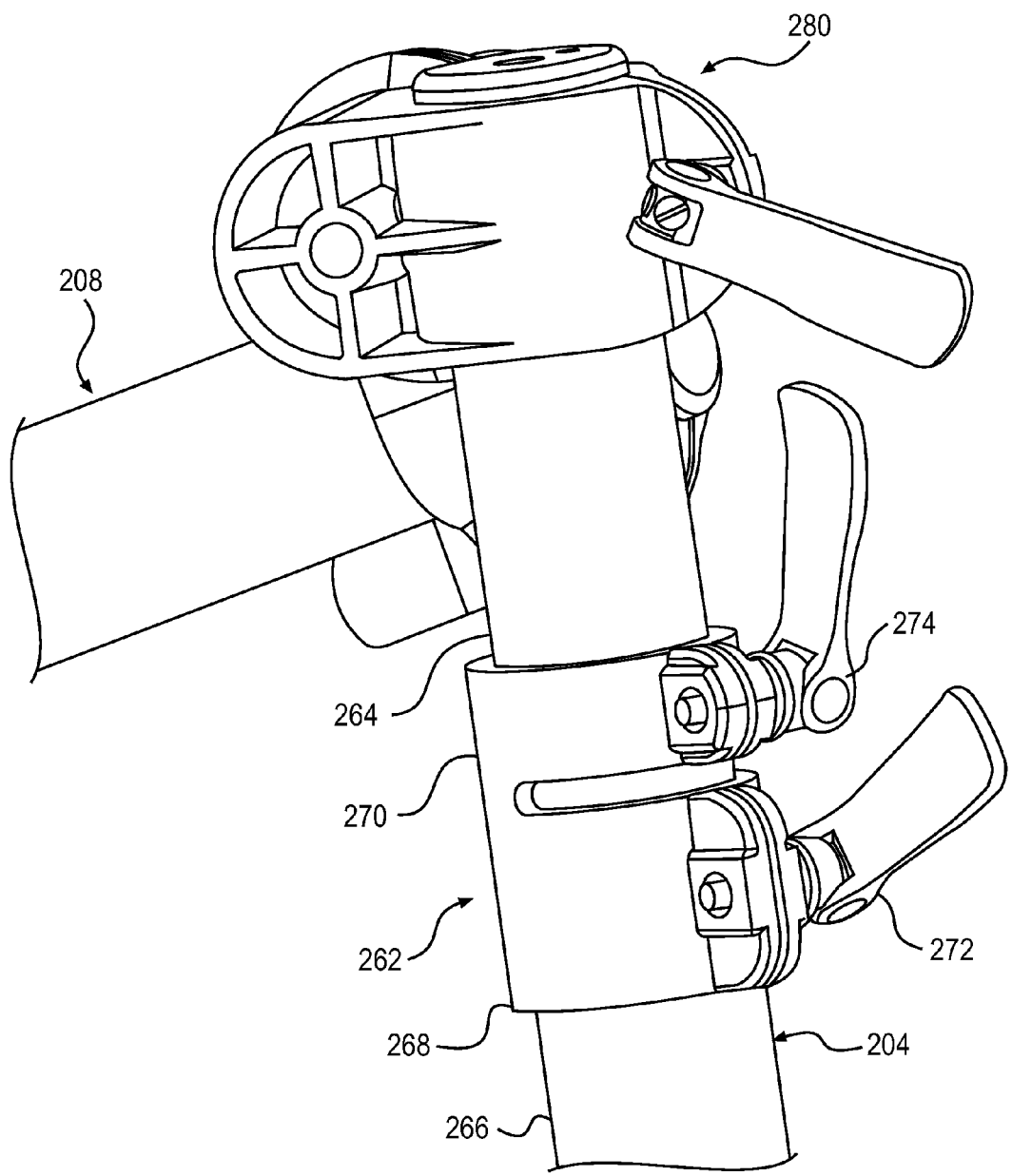
Figure 9:
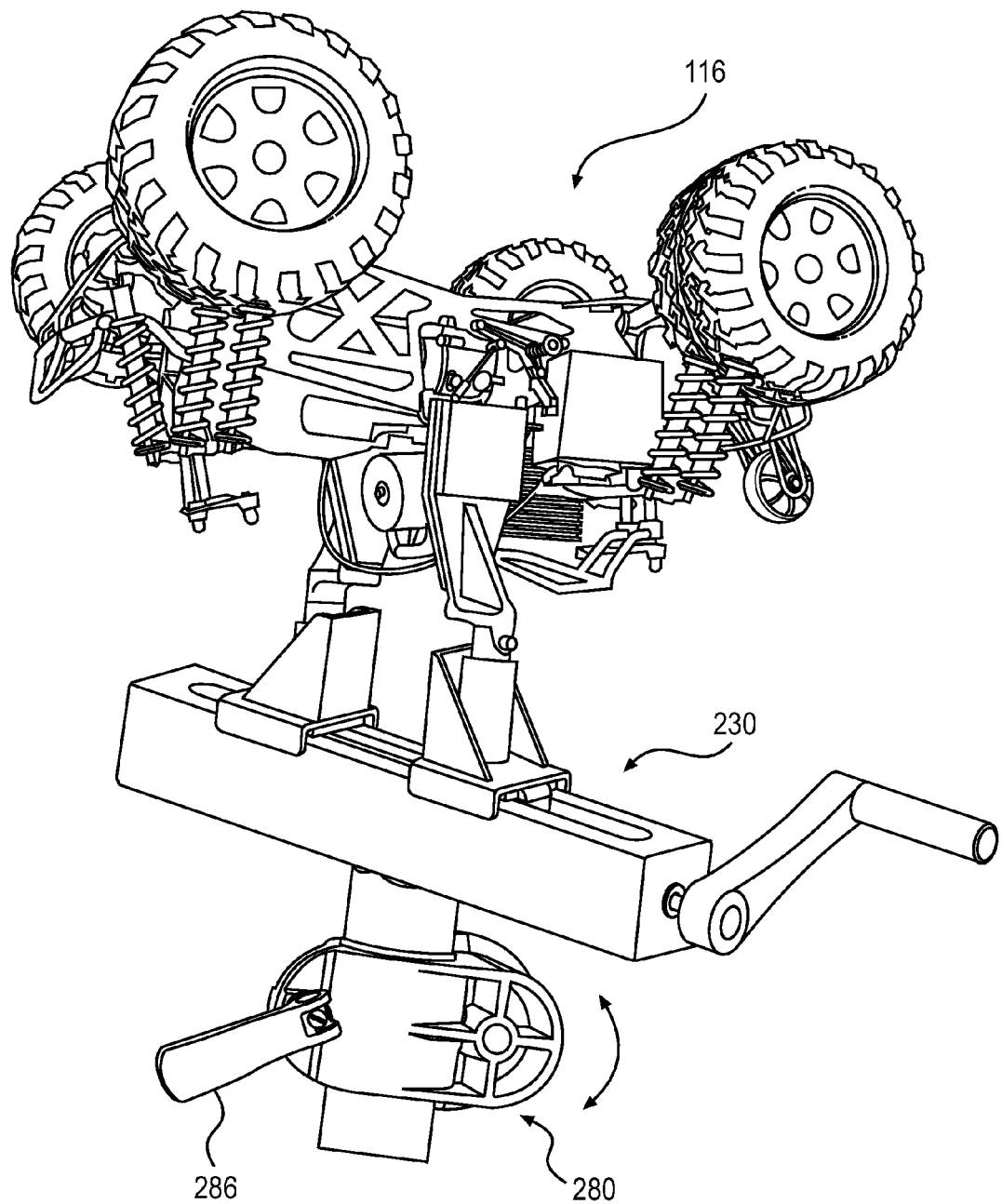
Figure 10:
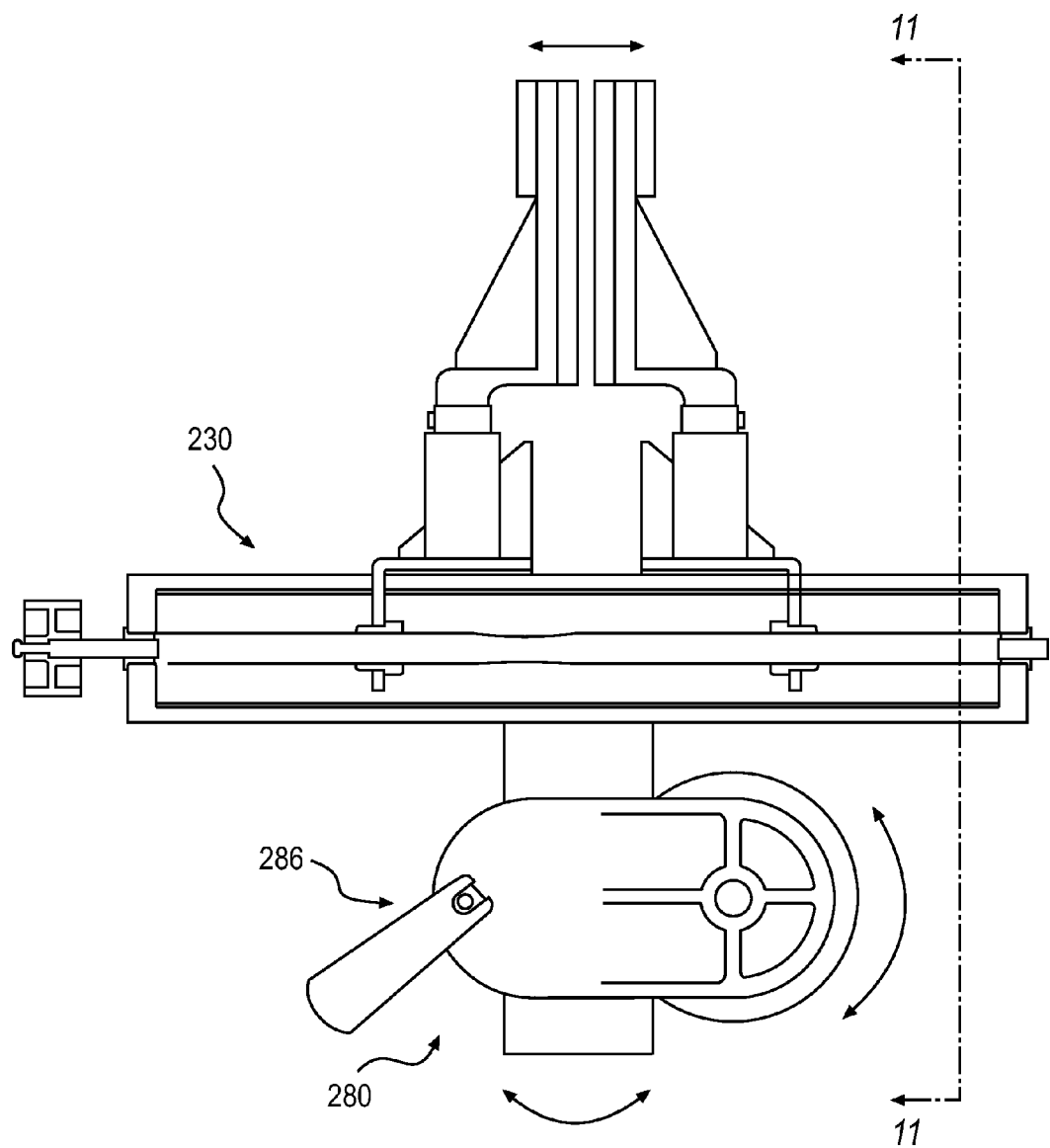
Figures 11, 12:
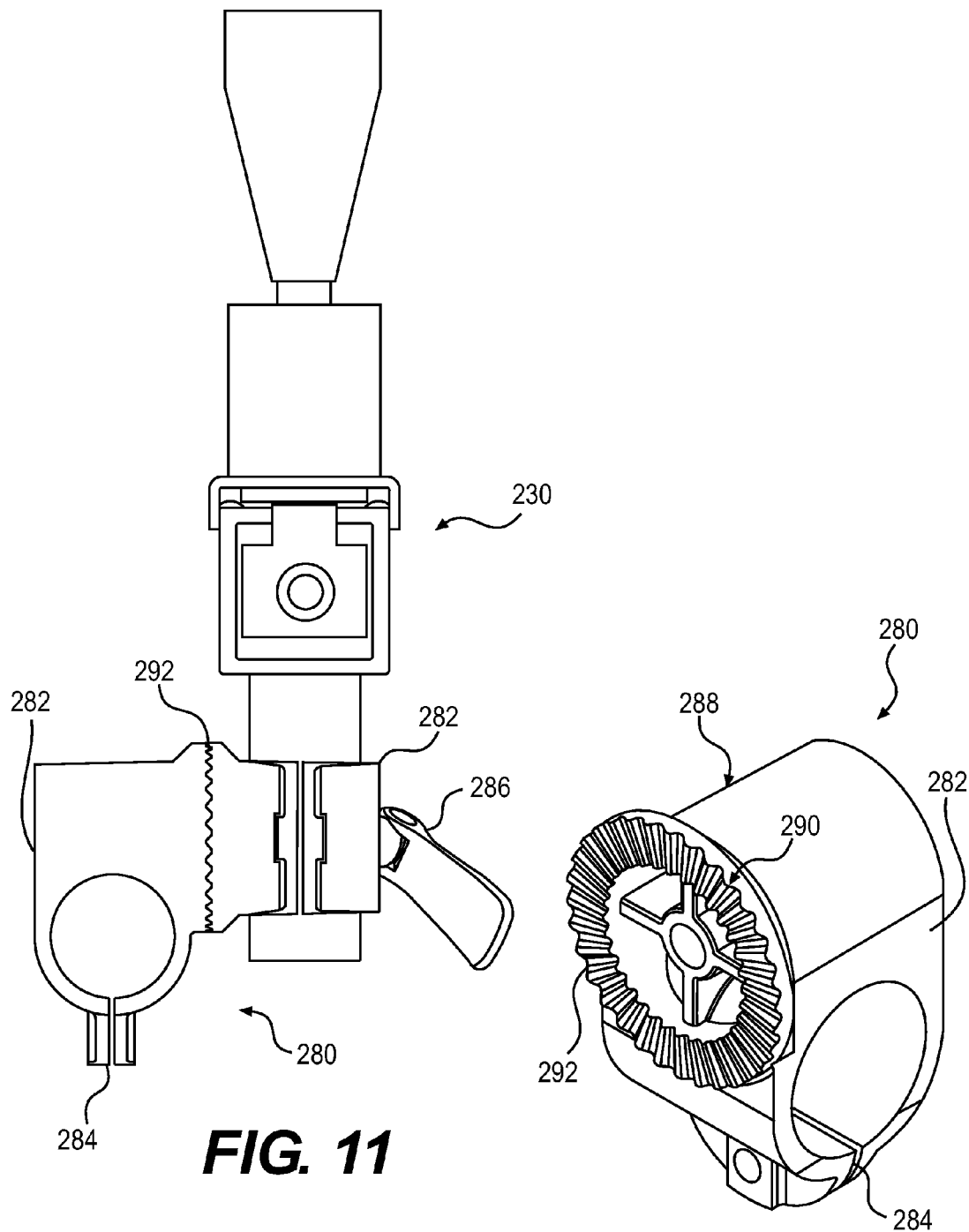
Figure 13B:
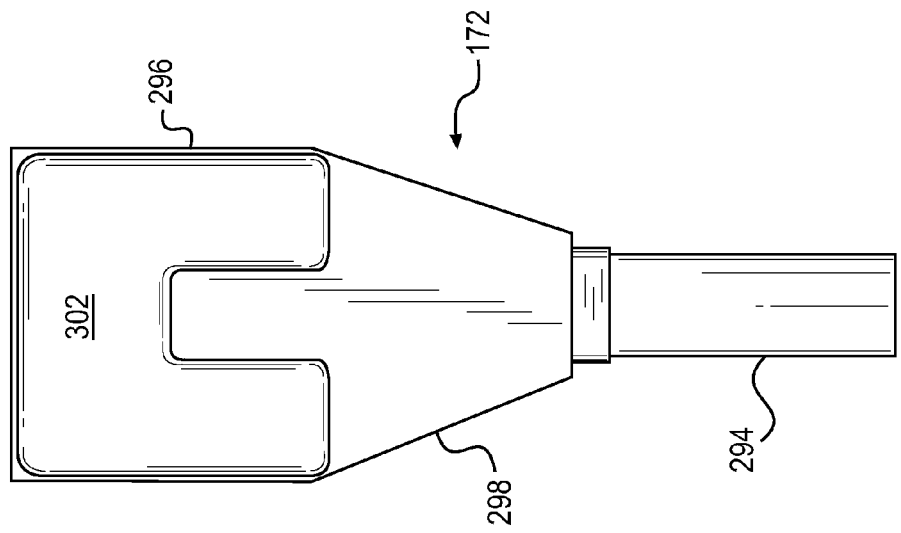
Figure 13A:
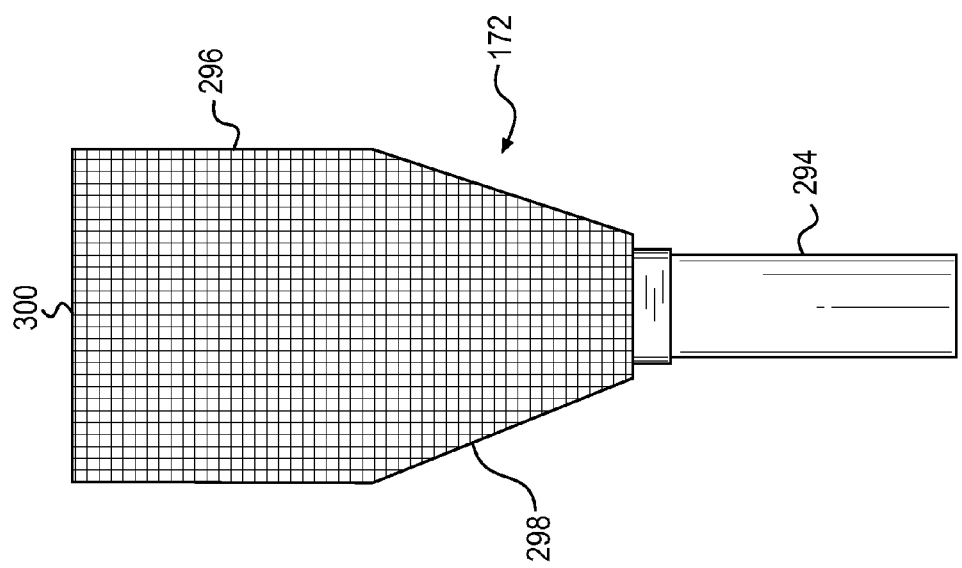
Figure 13D:
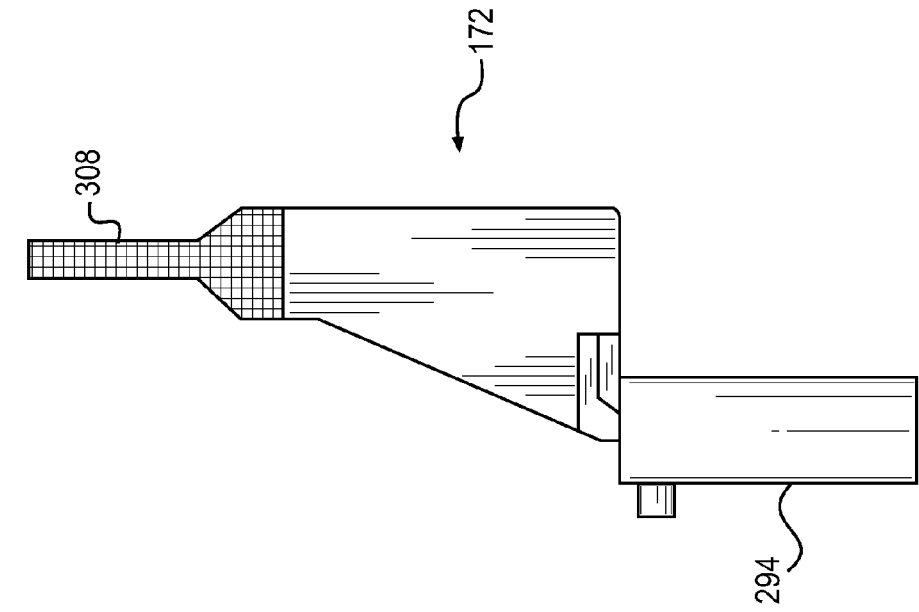
Figure 13C:
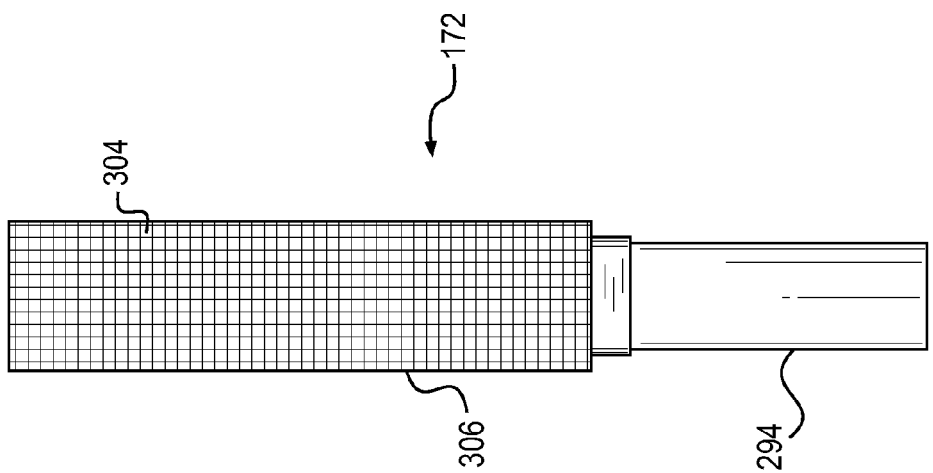
Figure 14:
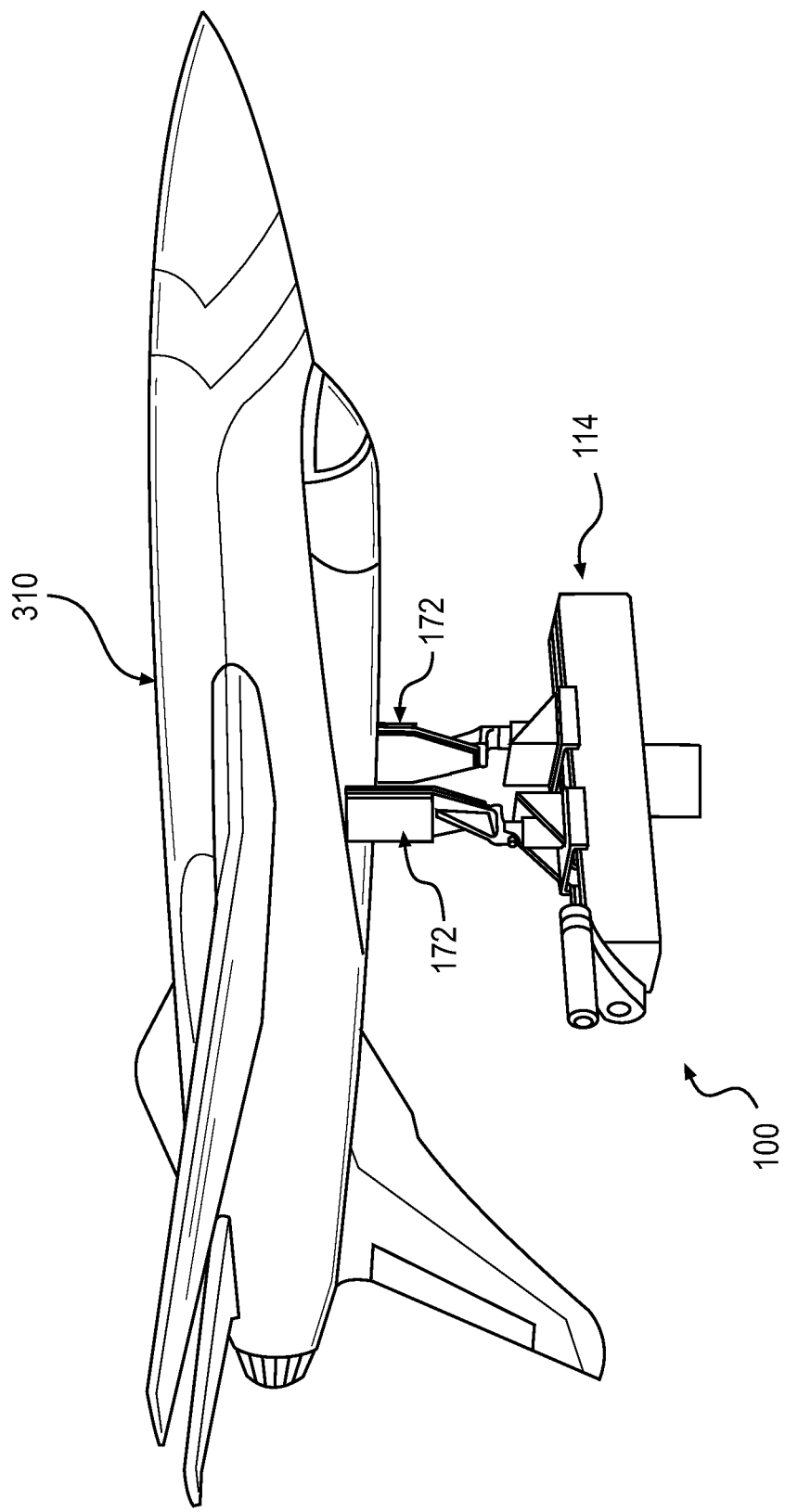

FIG. 5 discloses a left clamping pad that is mounted upon an extendable support arm to accommodate an increase in width between opposing clamping pads which may be necessary or desirable to secure some work vehicles;

FIG. 6 is an axonometric view of a remote controlled, nitro truck held in a posture for maintenance or repair by an articulated work holder in accordance with another embodiment of the subject invention;

FIG. 7 is an axonometric view similar to FIG. 6 without the attachment to a load bearing surface and without supporting a nitro vehicle to be worked on to disclose functional structural features and details of another preferred embodiment of the subject invention capable of securely supporting an enhanced work load;

FIG. 8 is a partial axonometric detail view of an articulated junction of a second support arm and a fourth support arm showing details of a pivotal attachment of the second support arm with the fourth support arm and a linear extension attachment of the second support arm;

FIG. 9 is an axonometric view of an alternative vise assembly pivotally mounted at a distal end of a third support arm;

FIG. 10 is a side view of the vise assembly depicted in FIG. 9, partially broken away to show interior detail of a vise jaw drive and angular adjustment members mounted at a distal end of relatively short third support arm;

FIG. 11 is a partial cross-sectional view taken along section line 11-11 in FIG. 10 showing further details of the vise mounted at a distal end of the third support arm of the articulated work holder;

FIG. 12 is an axonometric partial view of an adjustable joint of the type fitted at the ends of the support arms to selectively lock adjacent support arms in a desired angular position;

FIG. 13A is a front view of one form of a clamp pad for use in accordance with the invention:

FIG. 13B is a front view similar to FIG. 12A disclosing an alternate gel filled clamping pad for use in accordance with the invention;

FIG. 13C is a front view of another narrower clamping pad for use with some vehicle models;

FIG. 13D is a side view of yet another clamping pad for use with certain more delicate fractional dimension vehicles; and FIG. 14 is an axonometric view of a fractional dimension, airplane body held in an upside-down working position by the subject articulated work holder invention.

DETAILED DESCRIPTION

Figure 1:
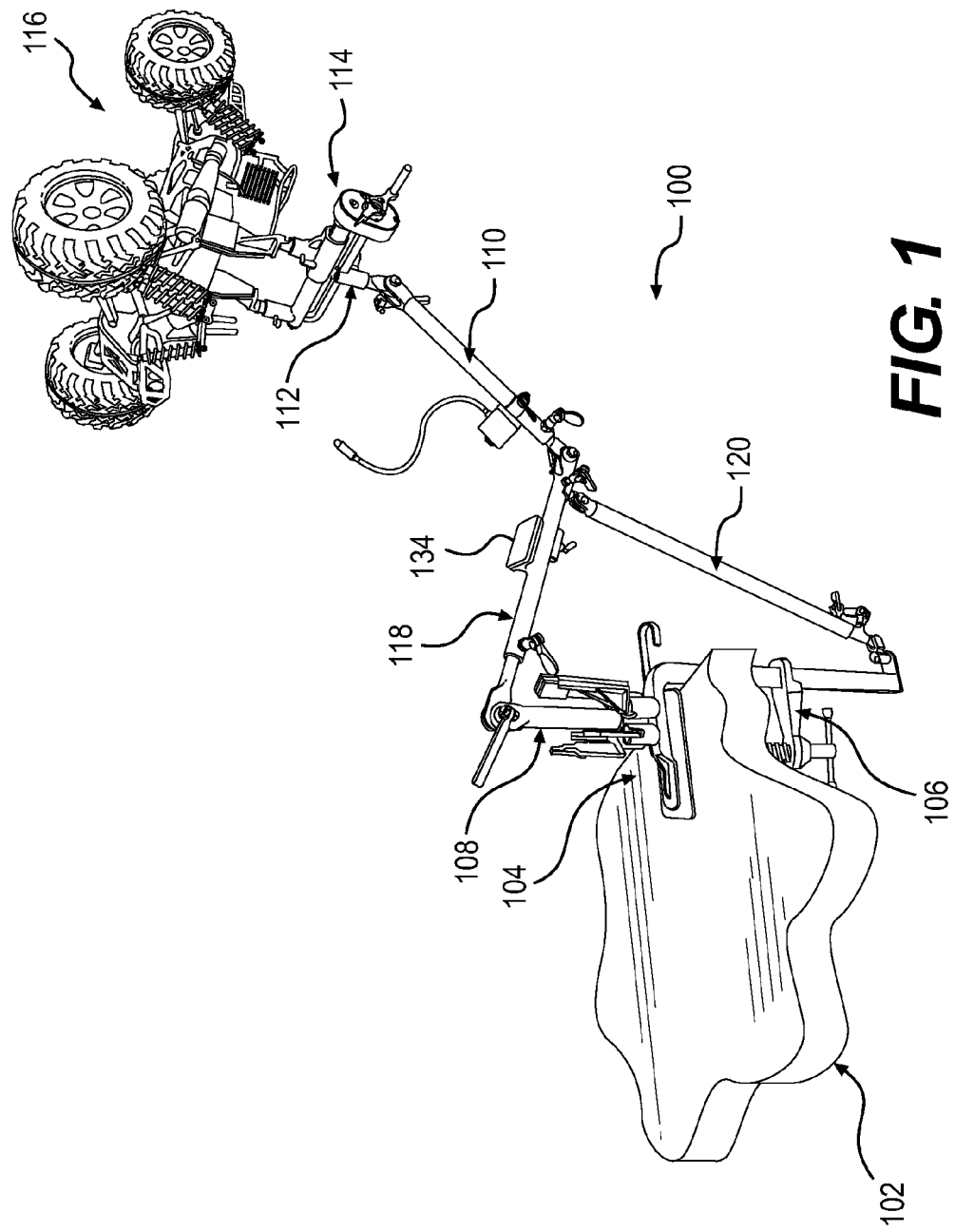
FIG. 1 is an axonometric view of a remote controlled, sophisticated, nitro truck held is a posture for repair by an articulated work holder in accordance with one embodiment of the subject invention.

Referring now more particularly to exemplary embodiments of the subject invention depicted in the drawing, wherein like reference numerals indicate like parts, FIG. 1 discloses an articulated work holder 100 for supporting a remotely controlled, fractional dimensioned, performance vehicle or the like in a fabrication, maintenance or repair posture. The articulated work holder 100 is shown mounted upon a generic stand or surface 102 by a base member 104 and an adjustable clamp assembly 106. A first support arm 108 has is connected to the base member 104 and projects generally vertically above the base 104. A second support arm 110 of the work holder 100 is pivotally connected to a third support arm 112. The third support arm 112 is connected to an adjustable gripping assembly or vise 114 which serves to hold a radio controlled nitro truck body 116 or the like, for operable fabrication, maintenance or repair as desired. A fourth support arm 118 extends between the first support arm 108 and the second support arm 110 and a fifth support arm 120 operably extends between the base 104 and the fourth support arm 118 In brief sum, FIG. 1 discloses one preferred embodiment of an articulated work holder according to the subject invention.

Figure 2:
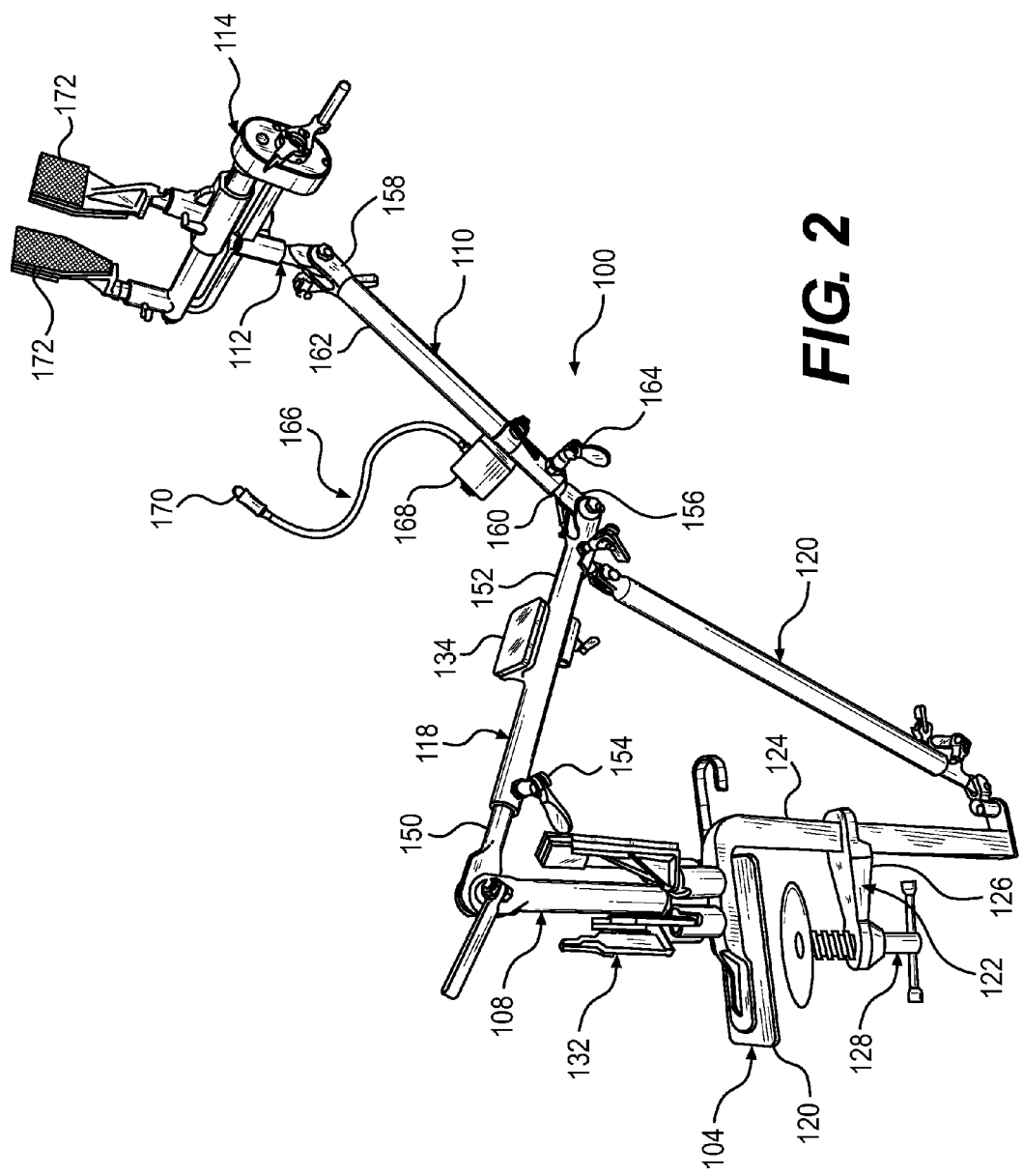
FIG. 2 is an axonometric view similar to FIG. 1 without the attachment to a load bearing surface and without supporting a nitro vehicle that further discloses structural features and details of a preferred embodiment of the invention.

Turning now to FIG. 2 the base 104 is composed with a generally planar base plate and an adjustable clamping assembly 122 includes a downwardly extending arm 124 which is triangular in cross-section and cooperates with a lateral arm 126 that has a triangular opening that is slightly larger in dimensions than the arm 122. Accordingly the lateral arm 124, when normal to the arm 124 and will vertically slide along the arm 124, however, when pressure is applied to a resistance surface by a screw clamp 128 the arm 124 will cant slightly and the vertical position of the arm 124 will be set so that the base 104 can be releasably mounted upon a mounting stand or stationary member 102.

Figure 3:
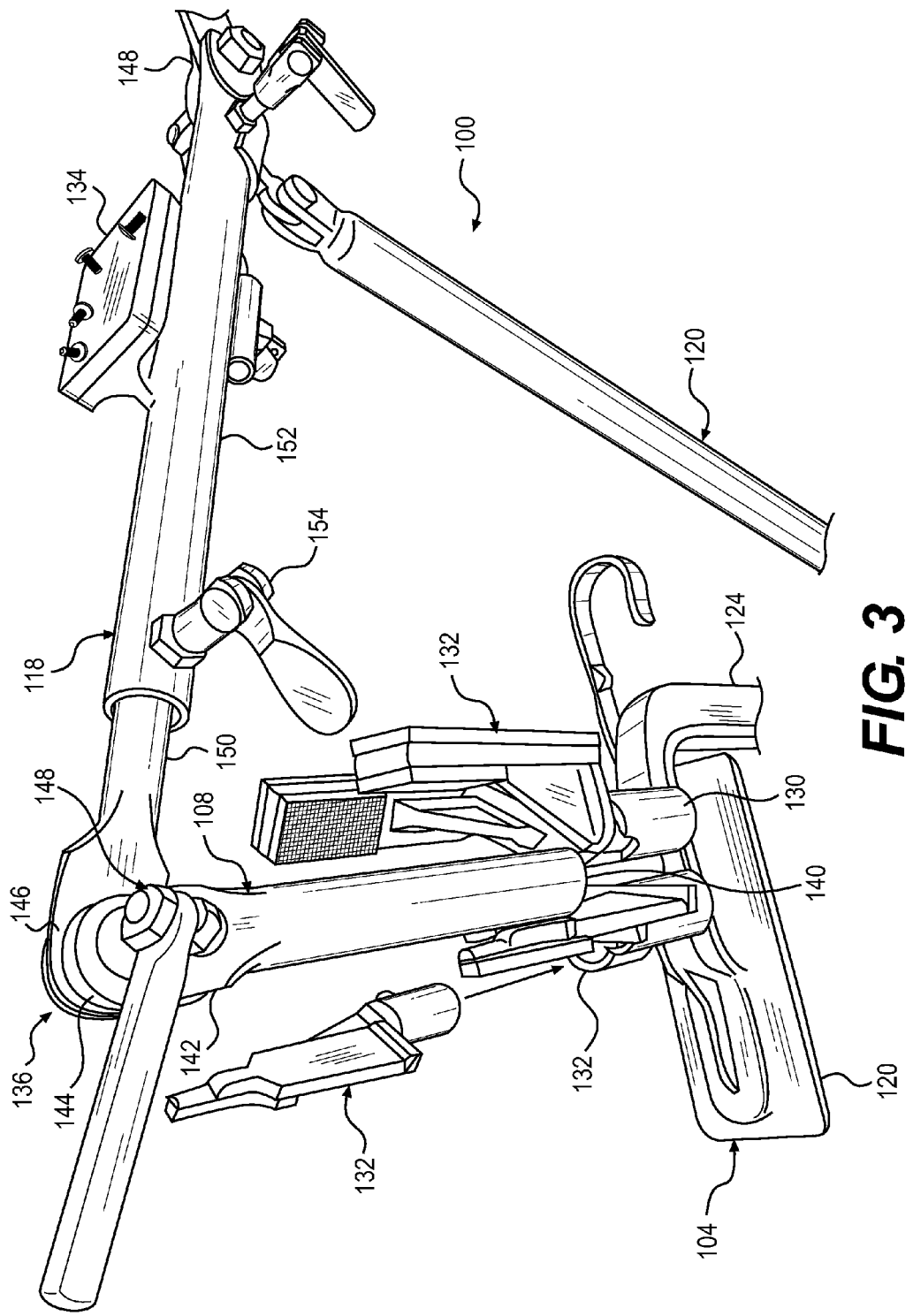
FIG. 3 is a partial detail view of a base and a first articulated support arm portion of the work holder showing a number of interchangeable bearing pads used in conjunction with the invention along with a magnetic pad feature to temporarily store and retain small working parts of a vehicle.

In FIG. 3, a partial detail view of the articulated work holder 100 discloses that a horizontal portion of the base 104 is provided with a plurality of vertically extending cylindrical columns 130 that are operable to receive a plurality of pairs of clamping pads 132 for the vise having various preferred configurations. FIG. 3 also discloses a magnetic pad mounted upon the fourth support arm 108. The pad carries a magnetic material face plate 134 and serves to selectively retain, for ready use, small parts and components such as metal screws and the like.

At a junction location of the first 108 and fourth 118 support arms there is an adjustable pivot and locking assembly 136. More specifically, as shown in FIG. 3 the first support arm 108 has a first end 140 connected to the base 104 and a second or distal end 142 that extends in a generally normal upright direction from the base member 104. The first support arm 108 is fashioned with a plurality of radially extending peripheral undulations or teeth at 144. The fourth support arm 118 has a first end 146 and a second end 148. The first end 146 has a ring of compatibly dimensioned radially extending peripheral undulations or teeth and a cam lock 148 operable serves to selectively secure the corresponding teeth in registry and thus the angular relationship of the fourth support arm with respect to the first generally vertical support arm 108. A similar locking structure is positioned at the second end of the fourth support arm 118.

The fourth support arm 118 is composed of two components. A first component 150 is telescoped for selective axial translation into a surrounding second tubular component 152. The axial position of the two components 150 and 152 is selectively set by application of a set lock member 152.

Returning now to FIG. 2, in this initial embodiment, the second support arm 110 is similar in construction to the fourth support arm 118. In this the second support arm 110 has a first end 156 and a second end 158. The second support arm is composed of a first member 160 that is telescoped within a second cylindrical member 162. The axial extension of the two members is selectively fixed for a particular adjustment by s set lock member 164 which can be cam actuated lock or a conventional set screw with a tightening arm pivotally connected to an end of the set screw. At the junction locations of the first end of the second support arm with the second end of the fourth support arm and the second end of the second support arm with a first end of the third are corresponding undulations or radially extending teeth are fashioned on opposing end portion of adjacent end members and a bolt of cam actuated lock 164 can serve to selectively hold the angular relationship of the second support arm with respect to the fourth support arm as shown.

The structural rigidity of the articulated work holder is enhanced by the provision of the fifth support arm support 120. In this the fifth arm support 120 has a first end pivotally connected to the base 104 via arm 124 and a second end connected to a location adjacent the second end of the fourth support arm 118. The fifth support arm is composed to a first member that telescopes within a cylindrical second member and is selectively held in a desired position by a set screw or cam lock mechanism similar to the second and fourth support arm structures.

Also shown in FIG. 2 is an LED light member 166 that is axially adjustably mounted upon the second support arm 110 and includes a battery case 168 and an LED light 170 that is operable to provide selective illumination to a work area of interest of a vehicle being fabricated, maintained or repaired.

Figure 4:
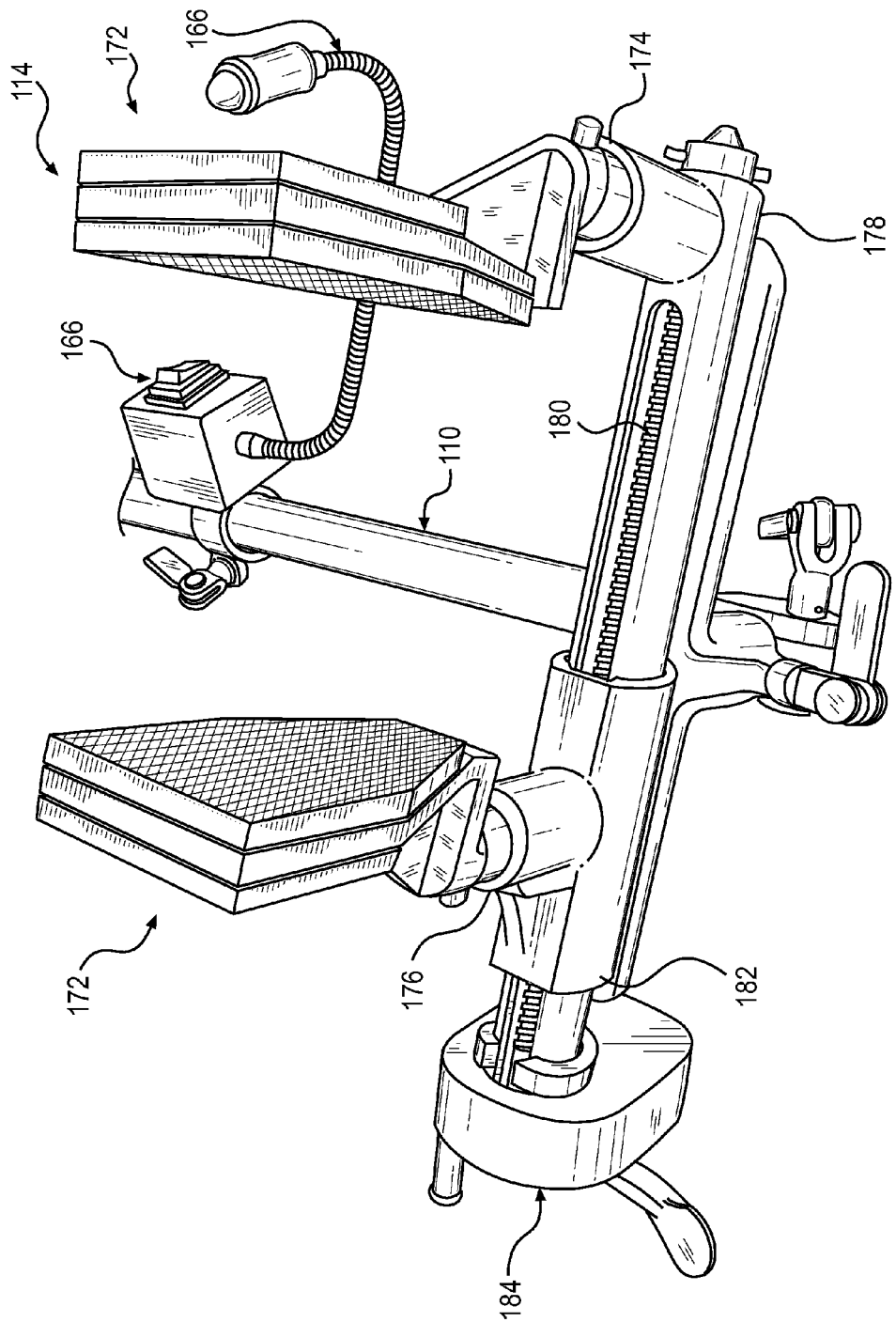
FIG. 4 is a partial axonometric view of opposing clamping pads and a vise drive rail as envisioned for use in one embodiment of the invention.

FIG. 4 discloses details of the adjustable gripping or clamping vise assembly 114. The assembly includes a pair of opposing clamping pads 172 that are mounted upon upstanding cylinder mounts 174 and 176. The first mounting cylinder 174 in turn is connected to a transverse cylinder 178 that in houses a concentric screw rod 180. Mounted for translation along the exterior surface of the transverse cylinder 178 is a slide member 182 which carries an internal threaded member operable to mesh with the screw drive rod 180. Accordingly rotation of the screw rod 180 by a gear drive assembly 184 will serve to translate the slide member 182 along the transverse cylinder 178. An opposing clamping pad 172 is mounted upon the slide member 182 and thus operably cooperates with the opposing clamping pad 172 to secure a fractional dimension vehicle between the two opposing clamping pads 172.

FIG. 5 discloses an adjustable clamping or gripping assembly 114 where an extendable support arm assembly 186 is shown connected between a mounting 176 and clamping pad 172. The extendable support arm 186 has a first portion 188 that is operable to telescope within a second surrounding portion 190 and is secured in a desired axial position by a wing nut set screw 192 or a pin extending through a series or row of apertures through one of the members 188 and 190 and a single aperture through the corresponding extendable support arm member.

Referring now to FIG. 6 a second preferred embodiment of the invention is shown. In this, an articulated work holder 200 is composed of a plurality of tubular support arms comprising a first generally vertical support arm 202, a second support arm 204, a third support arm and an optional fourth support arm 208.

The articulated work holder 200 includes a base member 210 that includes a C-clamp member 212 that is operable to be selectively fixed to a stationary surface such as illustrated in FIG. 1. The base member 210 also includes a generally planar base plate 214 that is operable to be disposed upon a stationary surface and clamped into position by the C-clamp 212 or alternatively bolted onto the stationary surface by one or more bolts 216 extending through the planar base plate 214 and into a stationary member.

The first support arm 202 includes a first end 218 connected to the base member 210. This connection can be fixed as by welding or alternatively rotational by the first end of the first support arm extending into a sleeve which in turn is fixed to the base member 210. The first support arm includes a second end 220 that operably extends generally vertically above the base member 210.

The second support arm 204 (note also FIGS. 7 and 8 in addition to FIG. 6) has a first end 222 and a second end 224. The second end 224 of the second support arm 204 is connected to a first end 226 of the third support arm 206 which is connected at a second end 228 to the base of a vise assembly 230.

In the second embodiment shown in FIG. 6 there is also an optional fourth support arm 208 having a first end 232 connected to the second end of support arm 202 and a second end 226 connected to the first end 22 of the second arm 208. Each of the second end of the first support arm and the first end of the fourth support arm, the second end of the fourth support arm and the first end of the second support arm, the second end of the second support arm and the first end of the third support arm are fitted with rotational and angular adjustment mounting connections which will be structurally discussed below but which functionally serve to permit rotational movement of each adjustment mounting upon a support arm and further serve to provide angular adjustment of one support with respect to an adjacent support arm.

FIG. 7 discloses yet another preferred embodiment of the invention. This embodiment is similar in many respects to the second embodiment and includes a base member 210 similar to the base member of FIG. 6. This embodiment also has a first support arm 240 along with a second support arm 204, a third support arm 206 and an optional fourth support arm 208.

In this third embodiment the first support arm 240 has a first end 242 and a second end 244. The first support arm 240 however is composed of two members. A lower member 246 is mounted upon a generally flat plate 214 and is composed of a cylinder having a diameter at least twice the diameter of any of support arms 204, 206 and 208. The first support arm 240 also include an upper support member 248 having a diameter slightly smaller than the diameter of lower member 246 such that the upper support member 248 is operable to snuggly telescope into the lower support member 246. One of the upper and lower support members has a plurality of diametrically opposed apertures positioned at regular intervals around the periphery of the support member and the other of the upper and lower support members has a single diametrically opposed aperture such that the two support member can be rotated and the single aperture brought in selective registry with a desired one of the plurality of peripheral apertures to receive a transverse diametrical pin and lock the two support members 246 and 248 into a desired angular relationship.

In addition this third embodiment has a fifth support arm 250 that is pivotally mounted at a first end 252 to the base member 210 and is pivotally mounted at a second end 254 to at least one of the second support arm 204 and the fourth support arm 208. The fifth arm 250 is composed of two members. A first tubular member 256 operably telescopes into a second tubular member 258 and a plurality of apertures in the second tubular member can selectively be brought into alignment with a single diametrical aperture in the first tubular member and a pin 260 can be inserted through the aligned apertures to fix a desired length of the fifth support arm 250 and thus the height of the vise work holder 230. Alternatively the telescoping members can be held in an axially desired position by a slip joint assembly discussed below.

Turning now to FIG. 8 there will be seen a slip joint assembly 262 referred to above. In this the second support arm 204 is composed of a first tubular member 264 having an external diameter that is slightly smaller than an internal diameter of a second tubular member 266 that extends to a second end of the support arm 204. Accordingly the first tubular member 264 is operable to slide into the second tubular member 266. A slip joint assembly or fitting 262 has a first end 268 that is substantially the same but slightly larger than the exterior diameter of the member 204. In a similar manner a second end 270 of the slip joint has a diameter that is substantially the same as but slightly larger than the exterior diameter of the first tubular member 264. A first 272 and a second cam lock 274 is positioned on the first 268 and second 270 ends of the slip joint respectively and actuation of the cam locks serves to bind and lock relative longitudinal movement of the first and second tubular members 264 and 266 to fix a desired length of the second arm 204.

Referring now to FIGS. 8 and 10-12 there will be seen a rotational and angular cam action mounting device 280 that is fitted at the connection junctions of the first, second, third and fourth support arms to secure a pivotal posture about the support arm and an angular relationship of one support arm with respect to an adjacent support arm.

Referring specifically to FIG. 12 there is shown an axonometric view of one half of a mounting device 280. The device includes a first portion 282 that is a sleeve that fits snuggly at an end of a support arm with a transverse gap 284. A cam action lever, note particularly FIGS. 9 and 11 serves upon actuation to bind rotational movement of the first portion 282 of the mounting device 280 with an engaged portion of an end of a support arm.

A second portion 288 of the mounting device 280 is integral with the first portion, is normal to an imaginary axis of the sleeve and carries a circular face 290 having a plurality of radially extending teeth 292. When two of the mounting devices 280 are fitted at a junction location of adjacent ends of support arms the teeth portions of the mounting devices are brought into registry, note particularly FIG. 11, and a centrally extending cam locking pin is operable to keep the opposing faces is a selected register position. Accordingly the angular position of adjacent ends of support arms can be selected and maintained in the selected angular relationship.

Turning now to FIGS. 13A-13D there will be see a series of view of various configurations of clamping pads 172 that are used with the subject articulated work holder. In FIG. 13A the pad 172 has a generally cylindrical mounting column 294 that supports a generally square pad portion 296 connected to a trapezoid portion 298. The clamping pad surface 300 is preferably composed of an elastomeric material that is operable to compress and conform to an irregular surface of a portion of a fractional dimension vehicle but firm enough to securely hold the vehicle by the articulated work holder 100.

FIG. 13B is a view similar to FIG. 13A however the work engaging surface 302 of the clamping pad is composed of a generally U-shaped gel bag that is flexible but firm enough to securely conform to an irregular vehicle surface but firmly hold the vehicle in a secure position.

FIGS. 13C-13D disclose detailed views of alternative configurations of the clamping pads 172. In this, FIG. 13C discloses a pad with a rectangular configuration 304 having a relatively narrow width compared with the pads of FIGS. 13A and 13B. The contact pad 304 is fitted with an elastomeric surface composition 306 that is operable to securely engage an irregular surface of a vehicle. The thickness and composition of the surface composition can vary depending upon the intended use but usually has the consistency similar to a quarter inch thickness of a computer mouse pad. In FIG. 13D the distal end of the clamping surface comprises a square or cylindrical portion 308 that may or may not be coated with an elastomeric outer surface.

Although FIGS. 1-13 have illustrated the subject articulated work holder 100 in use to support a nitro truck body other sophisticated vehicles can be operably hold in a desired work position such as airplanes of various sizes and sophistication, boats, helicopters and the like. Moreover the subject articulated work holder has application in hobby construction environments, working on hand guns and rifles, and other devices where careful handling is required. Further in this connection, the term "work" is intended to include fractional dimension, performance vehicles as well as other items such as guns, models and things where precision is required for fabrication, maintenance and/or repair.

In this disclosure and claims the term "operably connected" is intended to include a direct physical connection and also connection through an intermediate member or members.

In the claims reference has been made to use of the term "means" flowed by a statement of function. When that convention is used applicants intend the means to include the specific structural components recited in the specification and drawings and in addition other structures and apparatus that will be recognized by those of skill in the art as equivalent structures for performing the recited function and not merely structural equivalents of the structures as described and shown.

In describing the invention, reference has been made to preferred embodiments. Those skilled in the art, however, and familiar with the disclosure of the subject invention may recognize additions, deletions, substitutions, modifications and/or other changes which will fall within the purview of the invention as defined in the following claims.

What is claimed is:

1. An articulated work holder for a fractional dimension, performance vehicle, and the like, comprising:
    a base member operable to engage and to be releasably affixed to a stationary support;
    a first support arm having a first end connected to said base member and a second end projecting away from said base member;
    a second support arm having a first end operably connected to said second end of said first support arm and said second support arm having a second end, said second support arm operably connected to said second end of said first support arm are provided with,
        an adjustable pivot connection operable to permit selective angular adjustment of said second support arm with respect to said first support arm, said second support arm including,
            a first member integral with said first end of said second support arm; and
            a second member integral with said second end of said second support arm and said first and second members being operable to interconnect and axially translate with respect to each other; and
            a mechanism connected to at least one of said first and second member to selectively lock relative axial translation between said first and second members of said second support arm;
    a third support arm having a first end pivotally connected to said second end of said second support arm and said third support arm having a second end projecting away from said first end;
    a fourth support arm having a first end and a second end and operable extending between a second end of said first support arm and a first end of said second support arm;
    a selectively pivotal connection connecting said second end of said first support arm with said first end of said fourth support arm for selectively setting an angular relationship between said first support arm and said fourth support arm of said articulated work holder; and
    a selectively pivotal connection connecting said second end of said fourth support arm with said first end of said second support arm for selectively setting an angular relationship between said fourth support arm and said second support arm of said articulated work holder;
    said base member includes a generally planar base plate; and
    a selectively rotatable mounting between said first end of said first support arm and said base member base plate and wherein an imaginary longitudinal axis of said first support arm is approximately normal with respect to said generally planar base plate, said selectively rotatable mounting comprises, a collar fixedly mounted upon said generally planar base plate and having a plurality of apertures uniformly spaced about and through the periphery of said collar;

said first support arm comprises a tubular member having said first end dimensioned to snuggly fit at least one into or around said collar and said first end of said tubular first support arm having at least one set of opposing apertures extending diametrically through said first end of said first support arm such that angular rotation of said first support arm with respect to said collar is operable to bring said at least one set of opposing apertures of said first end of said first support arm into angular registry with opposing apertures of said collar such that a pin may be operable inserted through the opposing apertures of said first support arm and concomitantly through selected opposing apertures of said collar member to lock the angular relationship of said first support arm with respect to said collar and said base of said articulated work holder;

said first, second and third support arms being composed of tubular members having approximately the same external diameters, a fifth support arm having a first end and a second end and being pivotally connected at said first end of said fifth support arm to a lateral portion of said first support arm and being pivotally connected at said second end of said fifth support arm to a lateral portion of said second support arm;

said fifth support arm comprising at least two members operable to inter-engage and to longitudinally translate with respect to each other; and means to selectively lock translation of said two members of said fifth support arm such that said fifth support arm operable serve as a supporting brace between the angular relationship of said second support arm with respect to said first support arm of said articulated work holder; and a vise member connected to said second end of said third support arm and having opposing vehicle contact pads operable to selectively closed or opened with respect to each other to selectively hold a vehicle to be worked on between the contact pads in a desired position for fabrication, maintenance or repair of the fractional dimension, performance vehicle.

2. An articulated work holder for a fractional dimension, performance vehicle, and the like, as defined in claim 1 wherein:
said first, second and third support arms are composed of tubular members and the exterior diameter of said first support arm is at least twice the exterior diameter of either of said second and third support arms.

3. An articulated work holder for a fractional dimension, performance vehicle, and the like, as defined in claim 1 wherein said vise member comprises:
a generally hollow, solid rectangular base member;
a central longitudinal shaft having opposing vise threads fashioned on opposing ends and being supported at opposite ends by a bearing within end plates of said base member;
first and second opposing slide members supported to translate along said base member and having opposing internal vise threads and said opposing slide members being mounted on opposing ends of said central longitudinal shaft member wherein rotation of said central longitudinal shaft member serves to translate said first and second opposing slide members selectively toward and away from each other;
means connected to said central longitudinal shaft member for selectively rotating said central longitudinal shaft member and for concomitantly selectively translating said first and second opposing slide members toward and away from each other; and
a vehicle engagement pad mounted upon each of said first and second opposing slide members for engaging opposing portions of a fractional dimension performance vehicle between said engagement pad members to selectively support said fractional dimension, performance vehicle by said articulated work holder.

4. An articulated work holder for a fractional dimension, performance vehicle, and the like, as defined in claim 3 wherein each of said vehicle engagement pads comprises:
a cylindrical base member of said engagement pads being operable to be rotatably connected to a corresponding cylindrical base member on a slide member;
a generally rectangular backing member connected to said cylindrical member; and
a resilient covering mounted upon said generally rectangular backing member to engage a surface of a fractional dimension, performance vehicle.

5. An articulated work holder for a fractional dimension, performance vehicle, and the like, as defined in claim 3 wherein each of said vehicle engagement pads comprises:
a cylindrical base member of said engagement pads being operable to be rotatably connected to a corresponding cylindrical base member on a slide member;
a backing member have a generally square cross-section; and
a resilient coating covering said backing member to engage a surface of a fractional dimension, performance vehicle.

6. An articulated work holder for a fractional dimension, performance vehicle, and the like, as defined in claim 3 wherein each of said vehicle engagement pads comprises:
a cylindrical base member of said engagement pads being operable to be rotatably connected to a corresponding cylindrical base member on a slide member;
a generally rectangular backing member connected to said cylindrical member; and
a gel pad mounted upon said generally rectangular backing member to engage a surface of a fractional dimension, performance vehicle.

7. An articulated work holder for a fractional dimension, performance vehicle, and the like, as defined in claim 1 and further comprising:
an LED light source mounted upon said second support arm for illuminating activity with respect to work being performed on a fractional dimension vehicle being held by said vise member.

8. An articulated work holder for a fractional dimension, performance vehicle, and the like, as defined in claim 1 and further comprising:
a magnetic pad mounted upon at least one of said first, second and third support arms for facilely storing small parts of a fractional dimension vehicle being held by said vise member.

* * * * *